United States Patent Office 3,508,618
Patented Apr. 28, 1970

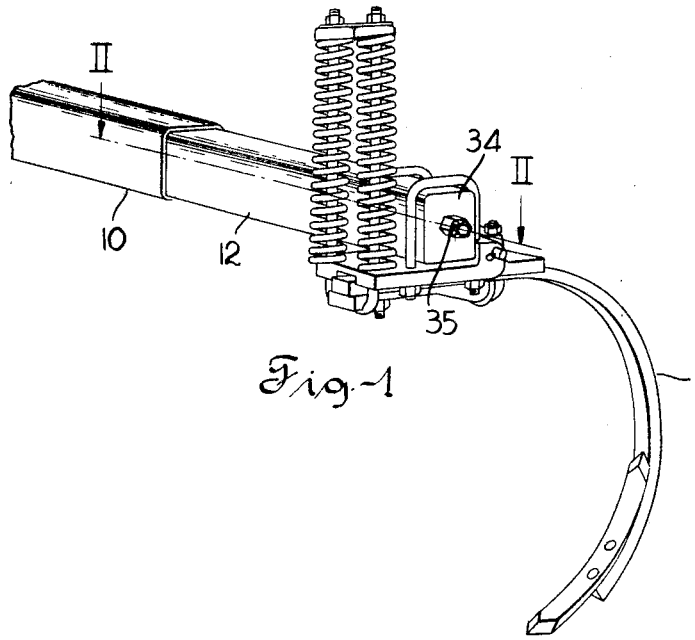
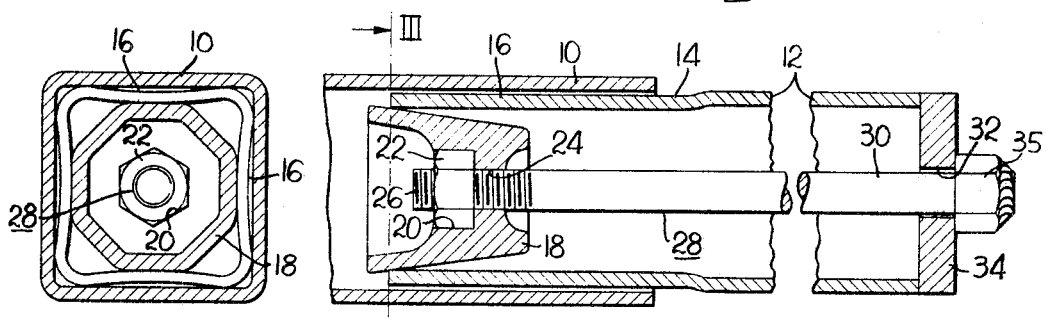

3,508,618
TOOL BAR EXTENSION
Maynard E. Walberg, Waukesha, Wis., assignor to Allis-Chalmers Manufacturing Company, Milwaukee, Wis.
Filed Apr. 27, 1967, Ser. No. 634,284
Int. Cl. A01b 63/00
U.S. Cl. 172—253                          1 Claim

ABSTRACT OF THE DISCLOSURE

Mechanism for attaching a tool bar extension to a tool bar in longitudinal alignment thereto including providing an extension of slightly greater area than the inside area of the tool bar, reforming a portion of the extension so that it will be telescopically received in the tool bar, and providing an expanding mechanism inside the extension and operable from outside the extension for expanding the area of the extension received within the tool bar for providing a tight fit between extension and tool bar.

---

The present invention relates to tool bar extension members for agricultural implements and more particularly to an improved expansion connector for securing an extension member to an implement tool bar.

In agricultural implements such as chisel plows and the like it is common practice to provide tool bar extensions to increase the working width of the implement. When installed the tool bar extensions desirably become a rigid part of the implement frame, and the means for securing the extension to the tool bar frame should be strong and reliable, easy to attach and detach, and inexpensive to manufacture. Furthermore such attaching means should not interfere with the attachment of tools to the tool bar frame or extension.

In the past the means for mounting tool bar extensions have consisted of bolted or externally clamped connections involving numerous parts which were expensive to manufacture, laborious to attach and detach and were in the way of attaching tools to such extension or adjacent tool bar.

The present invention has for its object to provide a connector which will overcome all of these disadvantages by simply consisting of a single fastening and bolt to accomplish a rigid connection.

A further object of this invention is to provide means for rigidly connecting a tubular pipe of generally square cross section to a tubular pipe of generally square cross section.

Other objects of this invention will be apparent hereinafter from the specification and from recital in the appended claim.

In the drawings:

FIG. 1 is an isometric view of a portion of a tool bar assembly embodying the invention and showing a chisel plow mounted on a tool bar extension;

FIG. 2 is a section view taken on line II—II of FIG. 1;

FIG. 3 is a section view taken on line III—III of FIG. 2; and

FIG. 4 is a section view of an alternate type of expansion plug which may be used.

Referring now to the drawing and particularly FIG. 1, it is seen that the invention has been applied to a chisel plow 8 carried by a tool bar 10 in a conventional manner. Specifically the chisel plow 8 is mounted on a tool bar extension 12 of tool bar 10. Both tool bar 10 and extension 12 are of square cross section and are dimensioned so that the extension tube 12 is slightly smaller than the frame tube 10. One end portion 14 of extension 12 (see FIG. 2) has been deformed so as to present four inwardly bowed walls 16 (see FIG. 3). This configuration of this one end of the extension tube reduces the size of end portion 14 so that it can be telescopically received inside the larger frame tube 10. If tube extension 12 had not been deformed, it would be too large to be received within frame 10.

A polygonally shaped cone member 18 is partly received within end portion 14 of the extension tube 12. This cone member is shown as being an octagonal cone and is provided with a socket type hexagonally shaped recess 20 to receive a nut 22. The cone member 18 is centrally apertured at 24 to receive the threaded end 26 of an elongated bolt 28 which end is also threadably received by the nut 22. The bolt extends the length of the tube extension with its shank 30 passing through an opening 32 in an end plate 34 attached to tube 12 by conventional means (not shown). It is apparent that head 35 of bolt 28 is larger than opening 32.

The cone member 18 is provided with eight sides with every other side engaging one of the bowed or deformed walls 16 of the extension tube 12 (see FIG. 3). When the cone member 18 is moved to the right as seen in FIG. 2, relative to the extension tube 12 through the medium of rotating bolt 28, the end portion 14 of the extension tube 12 will enlarge or expand as a result of the bowed walls 16 being wedged outwardly and thereby exerting an outward radial resultant force at each corner of the tube. This assures a rigid connection with the frame tube 10 and this movement is such that any manufacturing variations are taken up thereby permitting the use of commercial grade tubing. The cone member is prevented from turning by its octagonal shape.

In FIG. 4 an alternate cone member 36 is shown which can be used in place of cone member 18. Cone member 36 is an octagonal cone and is provided with a partially threaded passage 38 for threadably receiving the threaded end 26 of bolt 28. This cone member 36 obviously does not require a separate threaded member such as nut 22.

Tube extension 12 is easily removed. All that is required is to remove bolt 28, insert a drift pin or the like through opening 32 and drive cone member 18 to the left as viewed in FIG. 2 out of contact with tube extension 12. Tube extension 12 can then be readily removed from telescopic relation to main tube 10.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains, and as fall within the scope of the invention or the limits of the appended claim.

The embodiments of the invention in which an exclusive property or privilege is claimed are defined as follows:

1. A torque transmitting tubular tool bar of rectangular cross section, a tubular tool bar extension of rectangular cross section slightly smaller than said tool bar but greater than the inner portion in said tool bar and having one end portion of said tool bar extension deformed to present four inwardly bowed sides telescopically receivable within the inner portion in said tool bar, a cone member of a size to be partly received within the inner portion of said deformed portion, a plate attached to the other end of said extension and being provided with a central opening therethrough, a bolt having a head portion positioned on one side of said opening and being of greater area than said opening, said bolt having a body portion extending through said opening for threaded engagement with said cone member, said cone member being provided with a base portion of greater area than the inner portion of said deformed portion so that a rotation of said bolt causes longitudinal movement of said cone member into the inner portion of said deformed portion expanding said inwardly bowed sides outwardly into binding contact with the inner portion of said tool bar.

References Cited

UNITED STATES PATENTS

| | | | |
|---|---|---|---|
| 1,729,883 | 10/1929 | Lessman | 172—253 X |
| 2,034,051 | 3/1936 | Lipp | 287—124 |
| 2,816,769 | 12/1957 | Noble | 279—83 |
| 3,052,077 | 9/1962 | Gustafson et al. | 172—126 X |

FOREIGN PATENTS 1,470,341  1/1967  France.

ROBERT E. BAGNELL, Primary Examiner

A. E. KOPECKI, Assistant Examiner

U.S. Cl. X.R.

172—776; 287—124